Figure 1:
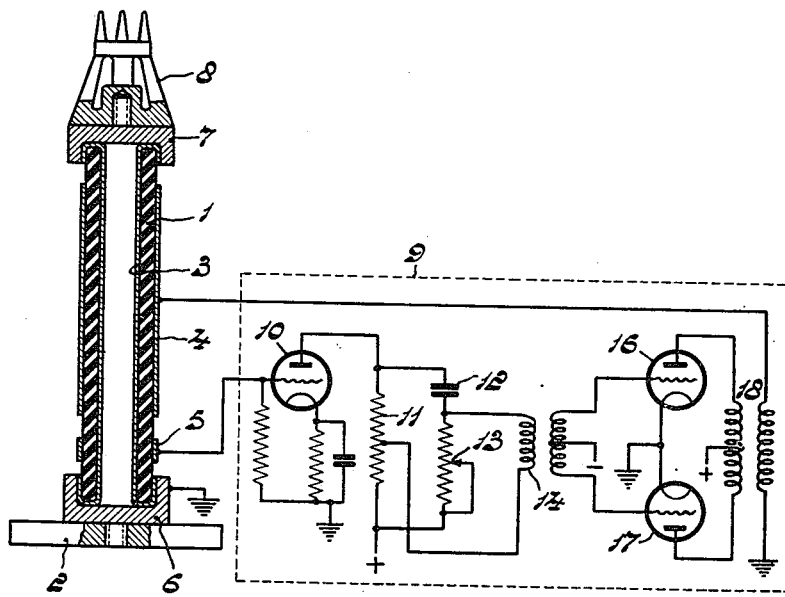

Nov. 4, 1952     G. H. JONKER     2,616,223
DEVICE FOR CONVERTING ELECTRICAL ENERGY
INTO MECHANICAL OSCILLATION ENERGY
Filed Dec. 26, 1951

INVENTOR
Gerard Heinrich Jonker

By    *Fred M. Vogel*

AGENT

Patented Nov. 4, 1952

2,616,223

UNITED STATES PATENT OFFICE 2,616,223

DEVICE FOR CONVERTING ELECTRICAL ENERGY INTO MECHANICAL OSCILLATION ENERGY

Gerard Heinrich Jonker, Eindhoven, Netherlands, assignor to Hartford National Bank and Trust Company, Hartford, Conn., as trustee Application December 26, 1951, Serial No. 263,336
In the Netherlands January 26, 1951

12 Claims. (Cl. 51—59)

It is known to convert electrical energy into mechanical energy and, conversely, mechanical energy into electrical energy with the use of a piezo-electric element comprising two electrodes to which the electrical energy is supplied. It has been suggested to make such elements from finely divided piezo-electric material, for example, quartz, seignette salt or an alkaline earth titanate, the material being bound by a binder or sintered. Steps may be taken here to polarize the material in a particular manner. The polarization may be effected by constantly exposing the element during its use to the action of an electric field, or it may be obtained as remanent polarization produced by exposing the material during a certain time to the action of a high electric direct voltage which is switched off after the element has been formed.

It is possible to manufacture bodies of comparatively great size and of different shapes in this manner. These bodies may, for example, serve as generators of ultra-sonic oscillations, as oscillatory elements in pick-ups, as control-elements in electric switches, and the like. The shape varies with the use; a spiral has been suggested for switches, and the shape of a plate for pick-ups.

In this case the voltage fed to the electrodes of the element is supplied by a source of energy, of which the frequency is comparatively constant, for example, in generators for ultra-sonic oscillations, or is variable in a wide-frequency range, for example, in loudspeakers.

The invention is based on the recognition of the fact that a materially more effective conversion of electric energy into mechanical energy is obtainable, if such a piezo-electric element in the form of a tube is caused to oscillate in its natural frequency determined by the length of the tube. It is known per se to cause piezo-electric crystals, for example, quartz crystals, to oscillate in their natural frequency, in order to produce high-frequency oscillations of very constant frequency. However, they are flat elements.

According to the idea underlying the invention a device for converting electrical energy into mechanical energy comprises a tubular body of polarized, polycrystalline, dielectric material having piezo-electric properties, of which the inner and outer walls are coated with electrodes, between which prevails an electric alternating voltage, under the action of which the body is deformed, the voltage operating at the electrodes being derived from the output circuit of an amplifier, at the input circuit of which operates a voltage produced at an additional electrode of the body, so that the body performs an oscillation in the direction of the length, the frequency of oscillations being determined by its mechanical properties in its load, the body being coupled with means for transmitting the energy produced by the variations in length to a member which transmits this energy to a further medium.

Consequently, a device according to the invention does not require a separate generator for the desired frequency.

It has been found that by utilizing the variations in length of the tubular body larger oscillation amplitudes than those obtained in known devices of the kind are obtainable, so that the body is capable of supplying great mechanical energy.

Moreover, by using a thin-walled tubular body a comparatively low voltage can produce a high electric field strength in the material of the wall of the body. The direction of length of the body is at right angles to the direction of the electric field, so that a large variation of the dimensions in this direction is obtained. The natural frequency is primarily determined by the dimension in the direction of length.

If the body is mechanically loaded, both the damping and the natural frequency vary to a considerable extent. This is, however, as has been found, no objection to the production of strong mechanical oscillations, if the properties of the amplifier are chosen in a correct manner. In spite of the intimate relationship between the natural frequency and the mechanical load an optimum effective conversion of energy invariably occurs, since the system can only oscillate in a natural frequency determined by the mechanical properties of the body and its load.

The device may be used for producing sonic or ultra-sonic oscillations. In this case one of the ends of the tube will be clamped tight and the other end will be provided with a member, such, for example, as a diaphragm or a plate, which transmits the oscillations to a medium.

A device according to the invention may furthermore be used as a drilling tool. In this case one end is secured to a chassis and the oscillating end is provided with a drilling head, the construction of which varies with the type of material to be drilled and the holes to be made. Such a drilling tool has been found to be particularly suitable for drilling brittle material such as mica or glass. The drilling operation consists in applying shocks to the brittle material in rapid succession, small particles of the material being removed at each shock. At the same time a suspension of grinding agent is preferably supplied, so that a grinding effect is simultaneously produced on the wall of the hole. Because of this shock effect, drilling is not restricted to circular holes, nor to a single hole. A suitable choice of the cross-sectional area of the drilling needle allows holes of varying shape to be made.

In order to simplify the manufacture, the inner wall is preferably provided with a single coherent coating, which is connected to the chassis, whereas the other electrodes are provided on the outer wall and separated by annular slits. However, as an alternative, for example, by immersion into a suspension of conductive material, two disconnected electrodes may be provided on the inner wall.

If use is made of the fundamental mode of oscillation of the tubular body, three electrodes are provided, two of which are separated from the third by the wall of the tube. Of the two first-mentioned electrodes, one serves as a feedback electrode to supply the input voltage to the amplifier. The surface of this electrode may be considerably smaller than that of the two other electrodes to which the output voltage of the amplifier is supplied. The most suitable embodiment is that in which the electrodes are formed in the shape of cylinders having no interruption in their periphery.

If use is made of a higher harmonic oscillation of the tubular body, there must be four or more electrodes. One of them preferably forms an uninterrupted coating of the inner wall of the tube, the other electrodes being again provided on the outer wall, i. e. at areas where the deformation of the body is maximum. The feed-back electrode may invariably have a surface which is small relative to the surface of each of the other electrodes.

If the polarization of the tube is the same throughout its length, the electrodes connected to the output circuit of the amplifier and provided on the outer surface of the tube must be fed in different phases in the case of the last-mentioned kind of oscillation, since at certain areas the tube shrinks and at others it expands. From an electrical point of view, this is in many cases troublesome, so that different polarizations at the points of the various main electrodes are preferably provided. The oscillation in a higher harmonic has the advantage that a greater energy can be supplied, as compared with a tube of about one-third of the length, oscillating with the same frequency in its basic form and that the damping of the member which transmits the energy plays only a small part.

It is not only possible to produce mechanical oscillations with large amplitude, but the tubular shape of the piezo-electric body also has the advantage that a high capacity, and hence a low impedance exists between the main electrodes connected to the output circuit of the amplifier, so that the output circuit of the amplifier may be readily adapted. Moreover, the tubes are strong and may be readily manufactured by moulding.

In order that the invention may be more clearly understood and readily carried into effect, it will now be described more fully with reference to the accompanying drawing.

Figure 2:
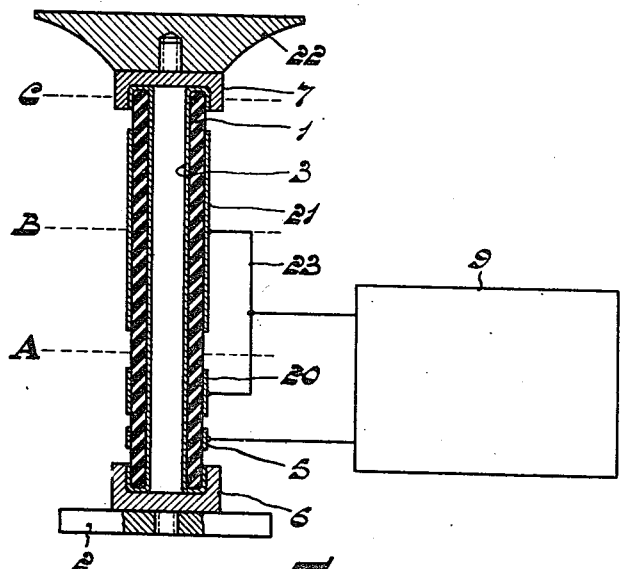

Fig. 1 shows a device, in which the piezoelectric element oscillates in its fundamental oscillation; in the device shown in Fig. 2 the third harmonic is utilized.

Referring to Fig. 1; 1 designates the tube of piezo-electrical material, for example, polarized, sintered barium-titanate. The tube is cemented in a holder 6, which is secured to a chassis 2. Three electrodes of, for example, silver are provided on the tube, i. e. an electrode 3 on the inner wall, extending beyond the ends of the tube and being connected at the lower end to the metal holder 6 and electrodes 4 and 5 applied to the outer wall. The upper end of the tube is provided with a metal hood 7, which may also be connected to the inner coating 3 and which transmits the oscillations traveling in the direction of length of the tube to the member 8, which is shown in Fig. 1 in the form of a head containing a number of drilling needles.

In order to set the tube 1 into mechanical oscillation provision is made of an amplifier 9 having two stages. The electrode 5, the axial length of which is small relative to that of the electrode 4 is connected to the control-grid of the amplifying tube 10, shown as a triode. The output circuit thereof includes an anode resistor 11 and the series combination of the capacitor 12 and a second resistor 13, of which the value may be varied with the use of a sliding contact. The said series combination is connected in parallel with the resistor 11. The common point of the capacitor 12 and the resistor 13 is connected through the primary winding 14 of the output transformer of the first stage to a point of the resistor 11.

The network described constitutes a phase control; the control of the phase is carried out by varying the resistor 13.

The second stage of the amplifier is constructed in the form of a push-pull stage comprising two tubes 16 and 17 and an output transformer 18. One end of the secondary winding of this transformer is grounded and the other end is connected to the electrode 4. The electrode 3 is also grounded via the chassis.

It is invariably possible to adjust the most favorable condition for producing oscillations with the use of the phase control.

The electrode 5 is arranged as near as possible to the clamped end of the tube 1, since in this area the deformation in the direction of length is maximum and the feedback voltage is also maximum. In order to avoid feed-back between the output circuit and the input circuit of the amplifier through the capacity between the electrodes 4 and 5, the spacing between these electrodes must not be too small.

It has been found that a length of the tube of about 10 cms., an outer diameter of about 5 mms., and a wall thickness of 75 mms., an adequate oscillation amplitude is obtainable at a frequency of about 5000 to 6000 cs., depending on the mass of the head of the load. In this case the output power of the amplifier is about 12 w.; a great part of the electrical energy supplied to the electrodes 3 and 4 is converted here into mechanical energy. The axial length of the electrode 4 may be about 70 mms., that of the feed-back electrode about 5 mms., and the spacing between these electrodes may also be 5 mms. In the case of stronger load it is desirable to choose the wall thickness to be slightly larger; an outer diameter of 9 to 11 mms., and an inner diameter of 7 to 8 mms., yield favorable results.

In the device described the length of the tube corresponds to about one-quarter of the wavelength of the oscillation; in this case, however, the mass of the member for transmitting the energy and the mechanical load play a certain part.

Fig. 2 shows a device in which the tube oscillates in the third harmonic of the fundamental oscillation, in a manner such that the effective length corresponds to about three-quarters of the wavelength of the oscillation in the tube. At A the tube exhibits an antinode at about one-third of the length, viewed from the clamped basis, a loop at two-thirds of the length and again an antinode at the end of C. The strongest deformations again occur at the basis and in the sectional area B. Here are consequently arranged the main electrodes 20 and 21.

Since the deformations at the basis and in the sectional area B have opposite senses, a voltage of a phase opposite to that of the voltage at the electrode 21 must be supplied to the main electrode 20, if the tube has the same polarity throughout its length. However, as an alternative, the polarisation in the upper portion of the tube between the sectional areas A and C may be opposite to that of the lower portion, i. e. below the sectional area A. It has been found that such a permanent polarization may be readily realized. Subsequent to polarization, in this case, the main electrodes 20 and 21 may be interconnected through a conductor 23, which is connected to the output impedance of the amplifier 9. The feed-back electrode 5 is again located as near as possible to the basis. The electrodes 20 and 21 together with the electrode 3 serve at the same time to provide the different polarities; the lower portion and the upper portion of the tube must therefore be separated.

In the device shown in Fig. 2, the head 7 is secured to a member 22, having a flat top surface, which may, for example, serve to transmit sonic or ultra-sonic oscillations to a medium.

In the device shown in Fig. 2, the oscillation amplitude is smaller than that of the device shown in Fig. 1; however, the frequency is higher, so that nevertheless, under certain conditions, a greater energy may be obtained.

What I claim is:

1. A device for converting electrical oscillation to mechanical oscillations comprising a tubular body constituted by a polarized polycrystalline dielectric material exhibiting piezo-electric properties, said body being provided with a first electrode formed by a coating on the inner wall of said body, a second electrode formed by a coating on the outer wall of said body and a third electrode attached to said body, an electronic amplifier having input and output circuits, means coupling said output circuit to said first and second electrodes to apply a potential thereacross whereby said body vibrates in its axial direction, means to transmit said vibrations to a load, the frequency of said vibrations depending upon the mechanical properties of said body and said load, and means coupling said third electrode to the input circuit of said amplifier whereby the electrical oscillations generated by said body are applied thereto.

2. A device as set forth in claim 1 further including means coupled to said amplifier to control the phase of the potential applied across said first and second electrodes.

3. A device for converting electrical oscillation to mechanical oscillations comprising a tubular body constituted by a polarized polycrystalline dielectric material exhibiting piezo-electric properties, said body being provided with a first electrode formed by a coating on the inner wall of said body, second and third electrodes formed by respective coatings on the outer wall of said body, the surface area of the third electrode being small relative to the surface area of said first and second electrodes, an electronic amplifier having input and output circuits, means coupling said output circuit to said first and second electrodes to apply a potential thereacross whereby said body vibrates in its axial direction, means to transmit said vibrations to a load, the frequency of said vibrations depending upon the mechanical properties of said body and said load, and means coupling said third electrode to the input circuit of said amplifier whereby the electrical oscillations generated by said body are applied thereto.

4. A device as set forth in claim 3 wherein one end of said first electrode is grounded and the other end is connected to said transmitting means.

5. A device as set forth in claim 4 wherein the first electrode coating extends over both ends of the tubular body.

6. A device for converting electrical oscillation to mechanical oscillations comprising a tubular body constituted by a polarized polycrystalline dielectric material exhibiting piezo-electric properties, said body being provided with a first electrode formed by an annular coating extending over at least a portion of the inner wall of said body, second and third electrodes formed by respective annular coatings on the outer wall of said body, said second and third electrodes being separated by an intermediate annular surface of said body, an electronic amplifier having input and output circuits, means coupling said output circuit to said first and second electrodes to apply a potential thereacross whereby said body vibrates in its axial direction, means to transmit said vibrations to a load, the frequency of said vibrations depending upon the mechanical properties of said body and said load, and means coupling said third electrode to the input circuit of said amplifier whereby the electrical oscillations generated by said body are applied thereto.

7. A device as set forth in claim 6 wherein the first, second, and third electrodes are so positioned on said tubular body that it vibrates in its fundamental frequency.

8. A device as set forth in claim 6 further including a fourth electrode attached to said body, wherein the first, second, and fourth electrodes are so positioned on said body that it vibrates in a third harmonic of the fundamental frequency.

9. A device as set forth in claim 6 further including clamping means to hold one end of said body fixed in position wherein the third electrode is adjacent to said one end.

10. A device for converting electrical oscillation to mechanical oscillations comprising a tubular body constituted by a polarized polycrystalline dielectric material exhibiting piezo-electric properties, said body being provided with a first electrode formed by an annular coating extending over at least a portion of the inner wall of said body, second and third electrodes formed by respective annular coatings on the outer wall of said body, said second and third electrodes being separated by an intermediate annular surface of said body, the polarization of said body being different at the areas of the first and second electrodes, an electronic amplifier having input and output circuit, means coupling said output circuit to said first and second electrodes to apply a potential thereacross whereby said body vibrates in its axial direction, means to transmit said vibrations to a load, the frequency of said vibrations depending upon the mechanical properties of said body and said load, and means coupling said third electrode to the input circuit of said amplifier whereby the electrical oscillations generated by said body are applied thereto.

11. A device as set forth in claim 10 wherein said transmitting means includes a drilling head having a plurality of drills.

12. A device as set forth in claim 10 wherein said transmitting means includes a diaphragm through which said vibrations are supplied to the load.

GERARD HEINRICH JONKER.

No references cited.